US012611961B2

(12) United States Patent
Ando

(10) Patent No.: US 12,611,961 B2
(45) Date of Patent: Apr. 28, 2026

(54) ELECTRIFIED VEHICLE

(71) Applicant: TOYOTA JIDOSHA KABUSHIKI KAISHA, Toyota (JP)

(72) Inventor: Yuya Ando, Ichinomiya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 72 days.

(21) Appl. No.: 18/928,541

(22) Filed: Oct. 28, 2024

(65) Prior Publication Data

US 2025/0249784 A1 Aug. 7, 2025

(30) Foreign Application Priority Data

Feb. 6, 2024 (JP) ................................. 2024-016650

(51) Int. Cl.
| | |
|---|---|
| *H01Q 1/32* | (2006.01) |
| *B60L 50/60* | (2019.01) |
| *B60L 53/80* | (2019.01) |
| *H01M 50/204* | (2021.01) |
| *H01M 50/249* | (2021.01) |

(52) U.S. Cl.
CPC ........... *B60L 53/80* (2019.02); *H01M 50/204* (2021.01); *H01M 50/249* (2021.01); *H01M 2220/20* (2013.01)

(58) Field of Classification Search
CPC .. B60L 53/80; B60L 53/66; B60L 1/00; B60L 50/60; H01M 50/249; H01M 50/204; H01Q 1/32
See application file for complete search history.

(56) References Cited

U.S. PATENT DOCUMENTS

| | | | | | |
|---|---|---|---|---|---|
| 11,505,069 | B2 * | 11/2022 | Wakitani | ................. | B60L 1/003 |
| 11,833,923 | B2 * | 12/2023 | Cerundolo | .............. | B60L 50/20 |
| 11,862,850 | B2 * | 1/2024 | Yamashita | ............... | H01Q 9/42 |
| 11,888,211 | B2 * | 1/2024 | Swar | ........................ | H01Q 1/32 |
| 12,043,140 | B2 * | 7/2024 | Titus | ....................... | B60L 53/80 |
| 12,420,744 | B2 * | 9/2025 | Kyle | ....................... | B60R 25/30 |
| 2021/0039595 | A1 | 2/2021 | Kitamura | | |

FOREIGN PATENT DOCUMENTS

JP 2021-029080 A 2/2021

* cited by examiner

*Primary Examiner* — Tho G Phan

(74) *Attorney, Agent, or Firm* — SoraIP, Inc.

(57) ABSTRACT

An electrified vehicle in which a plurality of replaceable battery packs are arranged in a vehicle cabin, comprising: a plurality of antennas arranged in the vehicle cabin; and a control device that, when the plurality of antennas detect a radio wave transmitted by a communication device provided in each of the plurality of replaceable battery packs from a pedestal position of a battery terminal base for connecting at least one of the plurality of replaceable battery packs to electrified vehicle, identifies an arrangement position of a particular replaceable battery pack connected to electrified vehicle via the battery terminal base from among the plurality of replaceable battery packs based on a radio wave strength of the radio wave.

4 Claims, 6 Drawing Sheets

FRONT
OF THE VEHICLE ⟷ REAR
OF THE VEHICLE

ELECTRIFIED VEHICLE

CROSS-REFERENCE TO RELATED APPLICATION

This application claims priority to Japanese Patent Application No. 2024-016650 filed on Feb. 6, 2024, incorporated herein by reference in its entirety.

BACKGROUND

1. Technical Field

The present disclosure relates to an electrified vehicle.

2. Description of Related Art

A removable vehicle battery that is removably mounted on an electrified vehicle is known (see Japanese Unexamined Patent Application Publication No. 2021-029080 (JP 2021-029080 A), for example).

SUMMARY

Here, a replaceable battery pack, such as a removable vehicle battery, may be stolen because of its replaceable nature. For example, it is conceivable to provide each of a plurality of replaceable battery packs with a communication terminal capable of communicating with an electrified vehicle via a communication cord, and to detect the occurrence of a theft when the communication cord is extracted from the communication terminal.

If the replaceable battery pack is provided with a communication terminal, however, there is a possibility that the work of replacing the replaceable battery pack is troublesome, since the number of times of insertion and extraction of the communication cord is increased. In addition, there may be a case where any of the replaceable battery packs is stolen. In that case, it is difficult to specify the position at which the stolen replaceable battery pack has been arranged, if the positions of the replaceable battery packs are not shared with the electrified vehicle.

Thus, it is possible to provide an electrified vehicle that shares the positions of replaceable battery packs with the vehicle side while suppressing an increase in the number of terminals.

An aspect of the present disclosure provides an electrified vehicle in which a plurality of replaceable battery packs is arranged in a vehicle cabin, including:

a plurality of antennas arranged in the vehicle cabin; and
a control device that specifies an arrangement position of a specific replaceable battery pack, from among the replaceable battery packs, connected to the electrified vehicle via a battery terminal base for connecting at least one of the replaceable battery packs to the electrified vehicle, based on a radio wave intensity of a radio wave emitted from a communication unit provided in each of the replaceable battery packs when the radio wave is detected by the antennas from a base position of the battery terminal base.

In the above configuration, the control device may determine that the specific replaceable battery pack is connected to the battery terminal base when the arrangement position is specified.

In the above configuration, the control device may specify the arrangement position based on an intensity relationship of the radio wave intensity.

In the above configuration, one of the replaceable battery packs and the battery terminal base may include a non-contact tag;

another of the replaceable battery packs and the battery terminal base may include a non-contact tag reader; and the control device may specify the arrangement position based on the radio wave intensity and information recorded in the non-contact tag and read by the non-contact tag reader.

According to the present disclosure, the positions of replaceable battery packs can be shared with the vehicle side while suppressing an increase in the number of terminals.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described with reference to the drawings.

Figure 1:
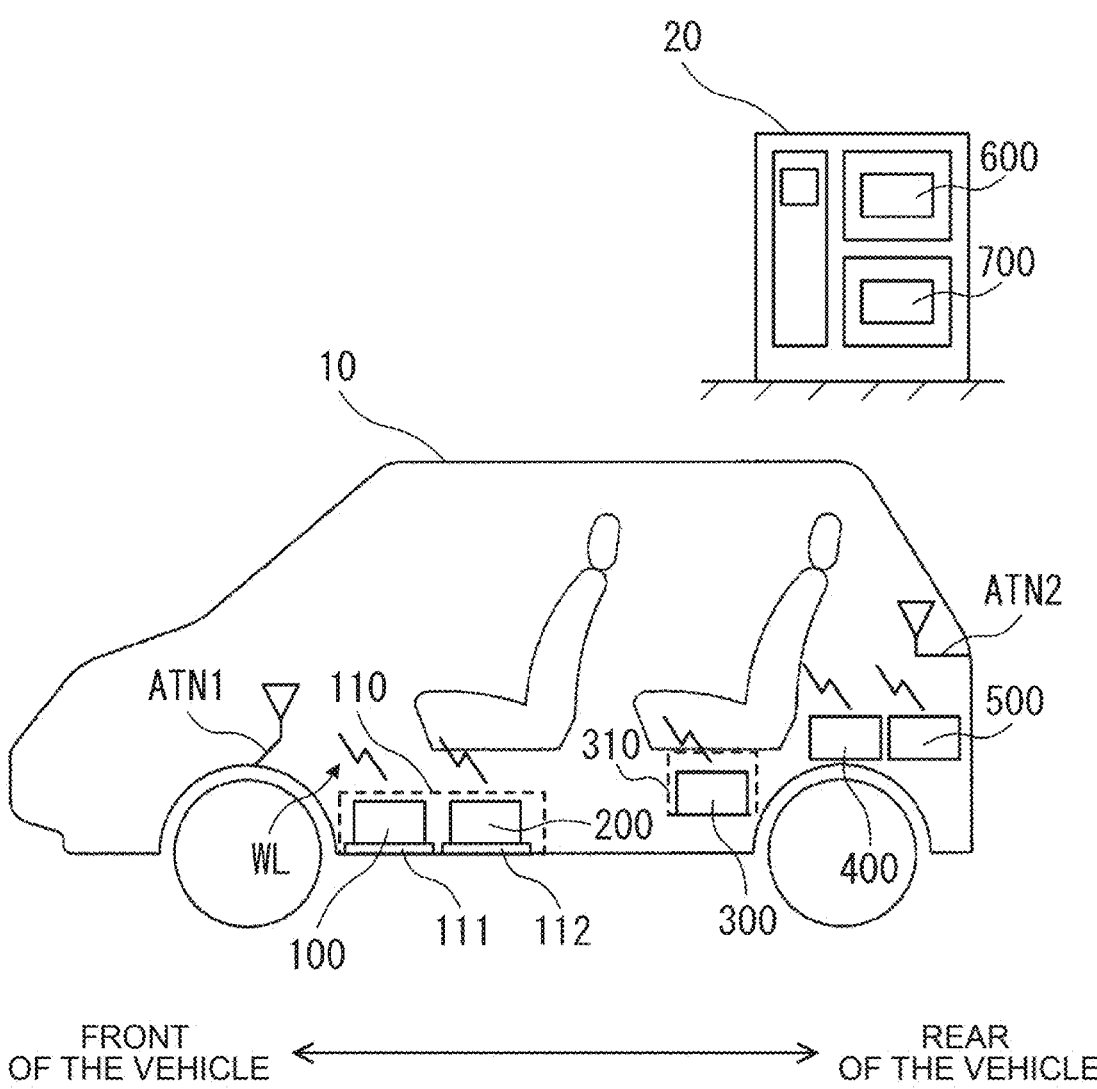
FIG. 1 is an example of a vehicle and a charger.

As shown in FIG. 1, the vehicle 10 is equipped with a plurality of replaceable battery packs 100,200,300,400,500. The vehicles 10 include electrified vehicle such as BEV (Battery Electric Vehicle). The plurality of replaceable battery packs 100,200,300,400,500 is disposed in the vehicle cabin of the vehicle 10. The vehicle cabin includes a passenger compartment, a luggage compartment, and the like.

For example, the replaceable battery pack 100,200 is disposed in the battery pack housing portion 110 provided under the floor of the passenger compartment of the vehicle 10. The replaceable battery pack 300 is disposed in a battery pack housing portion 310 provided under the seat of the passenger compartment of the vehicle 10. The replaceable battery pack 400,500 is disposed in the luggage compartment of the vehicle 10.

Here, the battery pack housing portion 110 is provided with a battery terminal base 111,112 for connecting the replaceable battery pack 100,200 to the vehicle 10. For example, when the replaceable battery pack 100 is connected to the battery terminal base 111, electric power stored in the replaceable battery pack 100 is supplied to the vehicle 10. Similarly, when the replaceable battery pack 200 is connected to the battery terminal base 112, the electric power stored in the replaceable battery pack 200 is supplied to the vehicle 10.

On the other hand, since the battery terminal base is not provided in the battery pack housing portion 310, the replaceable battery pack 300 disposed in the battery pack housing portion 310 cannot supply electric power to the vehicle 10. Similarly, since the battery terminal base is not provided in the luggage compartment of the vehicle 10, the replaceable battery pack 400,500 cannot supply electric power to the vehicle 10.

The replaceable battery pack 300,400,500 is mounted on the vehicle 10 as a spare in a state where power required for the replaceable battery pack 100,200 to move the vehicle 10 cannot be output (hereinafter, referred to as a battery exhaustion state). As a result, the driver of the vehicle 10 or the passenger can replace any one of the replaceable battery packs 100,200 with any one of the replaceable battery packs 300,400,500.

In addition, when the replaceable battery pack 300,400, 500 is exhausted, the driver can use the replaceable battery pack 600,700 of the charger 20 installed outside the vehicle cabin such as a public facility or a commercial facility. The replaceable battery pack 600,700 has been charged by the charger 20. Thus, the driver can replace any of the replaceable battery packs 100,200,300,400,500 with any of the replaceable battery packs 600,700. As a result, it is possible to suppress the vehicle 10 becoming out of battery while traveling.

As will be described later, a plurality of antenna ATN1, ATN2 is disposed in the vehicle cabin of the vehicle 10. The antenna ATN2 is disposed behind the vehicle in the vehicle cabin of the vehicle 10. The antenna ATN2 may be disposed on the vehicle rear right side, and another antenna (not illustrated) that differs from the antenna ATN1, ATN2 may be disposed on the vehicle rear left side. The antennae ATN1, ATN2 can detect radio WL emitted by the replaceable battery pack 100,200,300,400,500. The radio wave WL includes, for example, Bluetooth (registered trademark). The radio wave WL may include Wi-Fi.

Details of the vehicle 10 will be described with reference to FIG. 2.

Figure 2:
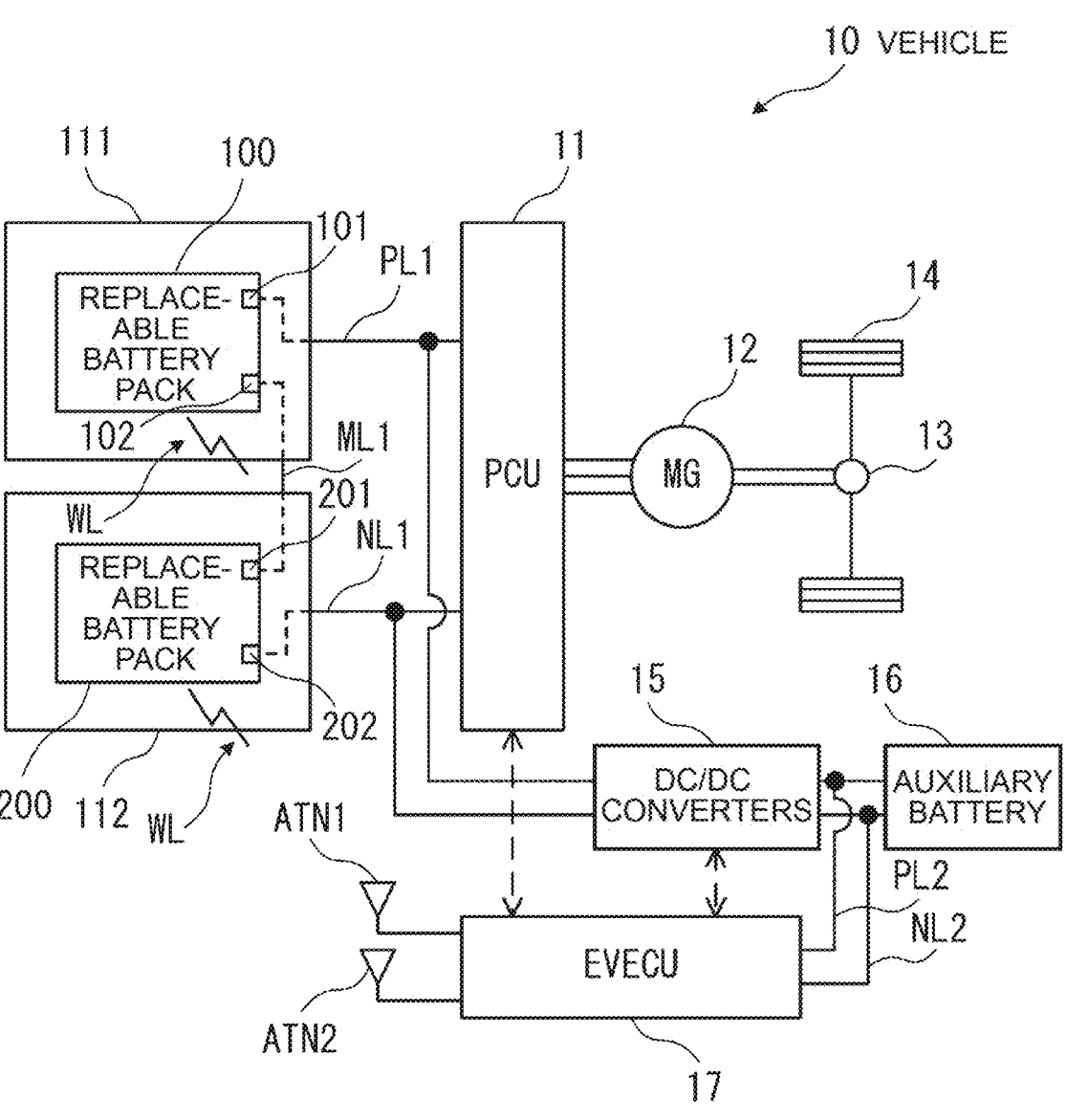
FIG. 2 is an example of a diagram illustrating details of a vehicle.

As illustrated in FIG. 2, the vehicle 10 includes the above-described battery terminal base 111,112 and an antenna ATN1, ATN2. In addition, the vehicle 10 includes a PCU (Power Control Unit) 11, a motor generator 12 (denoted as MG in FIG. 2), power transmission gears 13, and drive wheels 14. The vehicles 10 also include DC/DC converters 15, auxiliary batteries 16, and EVECU (Electric Vehicle Electronic Control Unit) 17. The battery terminal base 111 and PCU11 are electrically connected by a high-voltage power line PL1. The battery terminal base 112 and PCU 11 are electrically connected by a high-voltage power line NL1.

Each battery terminal base 111,112 includes a pair of connection terminals (not shown). A P terminal (positive electrode terminal) 101 of the replaceable battery pack 100 is connected to one of a set of connection terminals provided in the battery terminal base 111, and an N terminal (negative electrode terminal) 102 of the replaceable battery pack 100 is connected to the other side. The P terminal 201 of the replaceable battery pack 200 is connected to one of the pair of connection terminals provided in the battery terminal base 112, and the N terminal 202 of the replaceable battery pack 200 is connected to the other. One of the other of the pair of connection terminals provided on the battery terminal base 111 and one of the pair of connection terminals provided on the battery terminal base 112 are electrically connected by the power line ML1. As a result, the replaceable battery pack 100,200 is connected in series.

PCU 11 drives the motor-generator 12 with power supplied from the replaceable battery pack 100,200. PCU 11 includes inverters, converters, and the like, for example. The motor generator 12 is a permanent magnet type synchronous motor including a rotor in which a permanent magnet is embedded. The rotor of the motor generator 12 is mechanically connected to the drive wheels 14 via a power transmission gear 13.

The motor generator 12 generates kinetic energy by AC power supplied from PCU 11. The kinetic energy is transmitted to the power transmission gear 13, and the drive wheels 14 rotate. As a result, the vehicle 10 travels.

DC/DC converters 15 are electrically connected between the high-voltage power lines PL1, NL1 and the low-voltage power lines PL2, NL2. DC/DC converters 15 provide the low-voltage power lines PL2, NL2 with the power obtained by stepping down the voltage between the high-voltage power lines PL1, NL1. DC/DC converters 15 operate in accordance with control signals from EVECU 17. The low-voltage power line PL2, NL2 is connected to an auxiliary battery 16 that supplies power of about 12 volts.

EVECU 17 is an exemplary control device, and includes CPU (Central Processing Unit), memories, and the like. EVECU 17 is operated by electric power supplied from DC/DC converters 15 or the auxiliary battery 16. EVECU 17 is connected to the antennae ATN1, ATN2. EVECU 17 identifies the disposition position of the replaceable battery pack 100,200 based on the radio wave strength of the radio wave detected by the antenna ATN1, ATN2.

More specifically, EVECU 17 monitors the detection status of the radio wave of the antenna ATN1, ATN2 and determines whether or not the antenna ATN1, ATN2 has detected the radio wave. When EVECU 17 determines that the antenna ATN1, ATN2 has detected the radio wave, it estimates the radio wave strength of the radio wave detected by the antenna ATN1, ATN2. When estimating the radio wave intensity, EVECU 17 identifies the arrangement position of the replaceable battery pack 100,200 based on the intensity relation between the position of the battery terminal base 111,112 in the vehicle cabin and the radio wave intensity stored in EVECU 17 memories.

For example, when the replaceable battery pack 100 transmits radio waves, the radio wave intensity of the radio waves detected by the antenna ATN1 may be stronger than the radio wave intensity of the radio waves detected by the antenna ATN2. Here, EVECU 17 can estimate that the replaceable battery pack 100 is disposed and connected to the battery terminal base 111 instead of the battery terminal base 112.

As described above, EVECU 17 can identify the arrangement position of the replaceable battery pack 100 as the battery terminal base 111 by referring to the memory. Therefore, the communication terminal for specifying the arrangement position of the replaceable battery pack 100 in the replaceable battery pack 100 may not be provided separately from the P terminal 101 and the N terminal 102. Accordingly, the vehicle 10 can share the disposition position of the replaceable battery pack 100 with the vehicle 10 through EVECU 17 while suppressing the number of terminals.

Note that, for example, when the replaceable battery pack 500 (see FIG. 1) transmits radio waves, the radio wave intensity of the radio waves detected by the antenna ATN2 may be stronger than the radio wave intensity of the radio waves detected by the antenna ATN1. Here, it can be estimated that EVECU 17 is not disposed on the battery terminal base 111,112 and is not connected. Further, in addition to the antenna ATN1, ATN2, when the above-described another antenna is provided in the vehicle cabin, EVECU 17 can accurately identify the disposition position of the replaceable battery pack 100 or the like by three radio-wave strengths. Specifically, EVECU 17 can specify not only the front-rear direction of the vehicle 10 but also the arrangement position of the vehicle 10 in the widthwise direction.

In addition, the above-described memories store programs to be executed by CPU. The program may correspond to a flowchart described later. For example, when signals from various sensors provided in the vehicles 10 are inputted to EVECU 17, EVECU 17 generates control signals for controlling various devices including PCU 11 based on the signals and programming. When EVECU 17 generates a control signal, the control signal is outputted to the device to be controlled, and the operation of the device is controlled.

Figure 3:
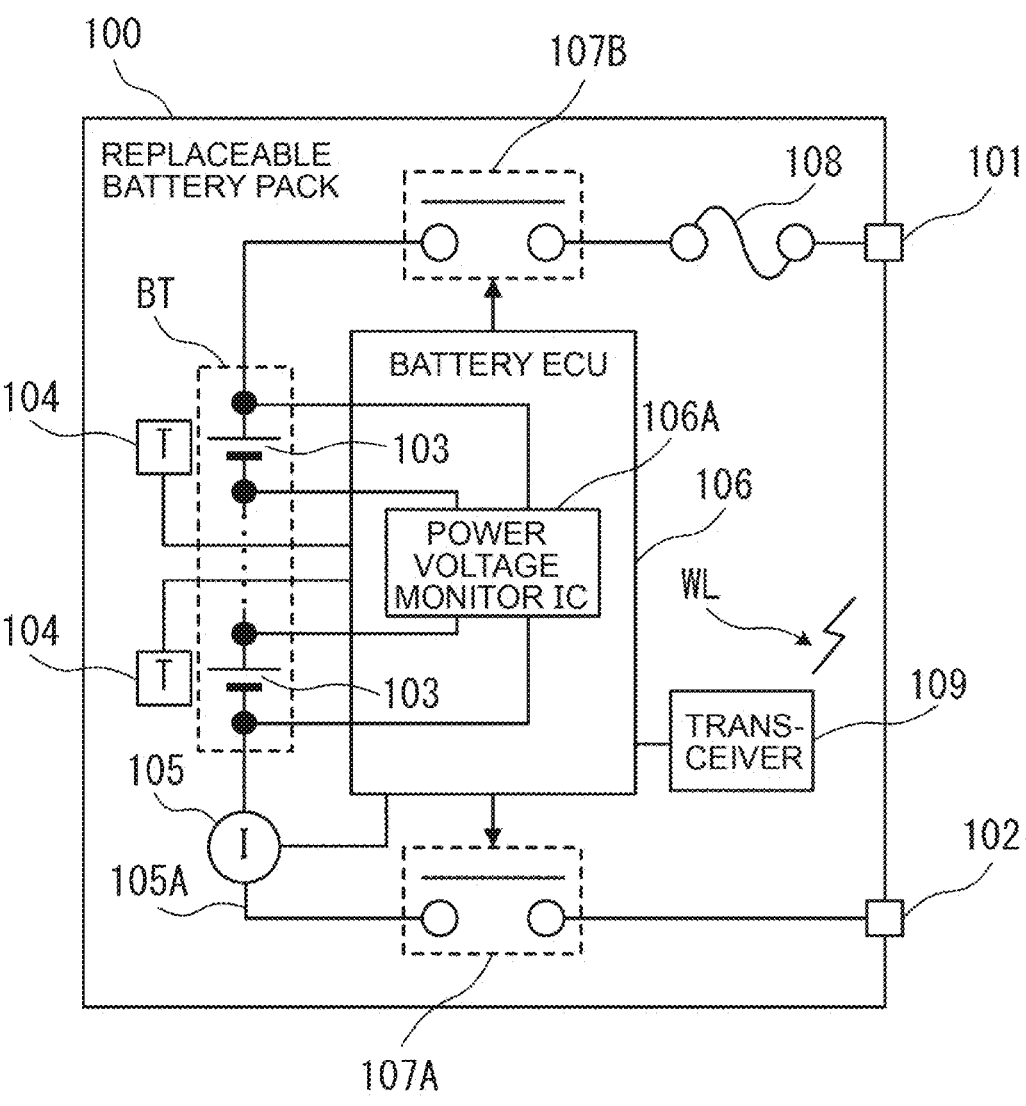
FIG. 3 is an example of a diagram illustrating details of a replaceable battery pack.

Next, the details of the replaceable battery pack 100 will be described with reference to FIG. 3. Since the replaceable battery pack 200,300,400,500,600,700 has the same configuration as that of the replaceable battery pack 100, a detailed description thereof will be omitted.

The replaceable battery pack 100 includes a plurality of battery cells 103, a plurality of temperature sensors (denoted as T in FIG. 3) 104, and a current sensor (denoted as I in FIG. 3) 105 in addition to the P terminal 101 and the N terminal 102 described above. The replaceable battery pack 100 includes a battery ECU 106, a system main relay 107A, 107B, a fuse 108, and a radio communication device 109.

The plurality of battery cells 103 are stacked and connected in series. Each of the plurality of temperature sensors 104 includes a thermistor. Each of the plurality of temperature sensors 104 is connected to a battery ECU 106. The plurality of temperature sensors 104 are arranged in association with the plurality of battery cells 103 individually. Accordingly, the plurality of temperature sensors 104 can individually measure the temperatures of the plurality of battery cells 103.

The current sensor 105 is provided between the negative terminal of the battery BT including the plurality of battery cells 103 and the system main relay 107A. The current sensor 105 detects a current inputted to the battery BT. That is, the current sensor 105 detects a current flowing in the busbar 105A between the negative terminal of the battery BT and the system main relay 107A. The current sensor 105 outputs a signal indicating the detection result to the battery ECU 106.

One end of the system main relay 107A is electrically connected to the negative terminal of the battery BT via the current sensor 105. The other end of the system main relay 107A is electrically connected to the battery terminal base 112 via the N terminal 102. One end of the system main relay 107B is electrically connected to the positive terminal of the battery BT. The other end of the system main relay 107B is electrically connected to PCU 11 via the fuse 108 and the P terminal 101.

The battery ECU 106 includes a voltage-monitoring IC (Integrated Circuit) 106A in addition to CPU and memories described above. In the memories of the battery ECU 106, data relating to charging and discharging of the battery BT is stored in advance. The information on charging and discharging includes, for example, a charging voltage lower limit value, a charging voltage upper limit value, a minimum charging current value, a discharging current upper limit value, a discharging voltage lower limit value, and the like. Charge/discharge data is determined based on the specifications of the battery BT.

The voltage monitoring IC 106A detects a voltage of each of the plurality of battery cells 103. The battery ECU 106 may be configured to detect the voltage-monitoring IC

106A. The voltage monitoring IC 106A may detect a voltage between terminals of the battery BT. In this instance, the battery ECU 106 may utilize an indication of the detected voltage-monitoring IC 106A. The battery ECU 106 controls the open/close status of the system main relay 107A, 107B based on a signal indicating a detection result of the voltage monitoring IC 106A, a signal indicating a detection result of the temperature sensor 104, and a signal indicating a detection result of the current sensor 105.

The radio communication device 109 is connected to a battery ECU 106. The radio communication device 109 receives electric power from the battery ECU 106 and transmits radio wave WL. The radio wave WL transmitted by the radio communication device 109 includes a battery identifier for identifying the replaceable battery pack 100. With this battery identifier, EVECU 17 (see FIG. 2) can distinguish the radio wave WL transmitted from the replaceable battery pack 100 from the radio wave WL transmitted from the replaceable battery pack 200,300,400,500 (see FIG. 2).

Figure 4:
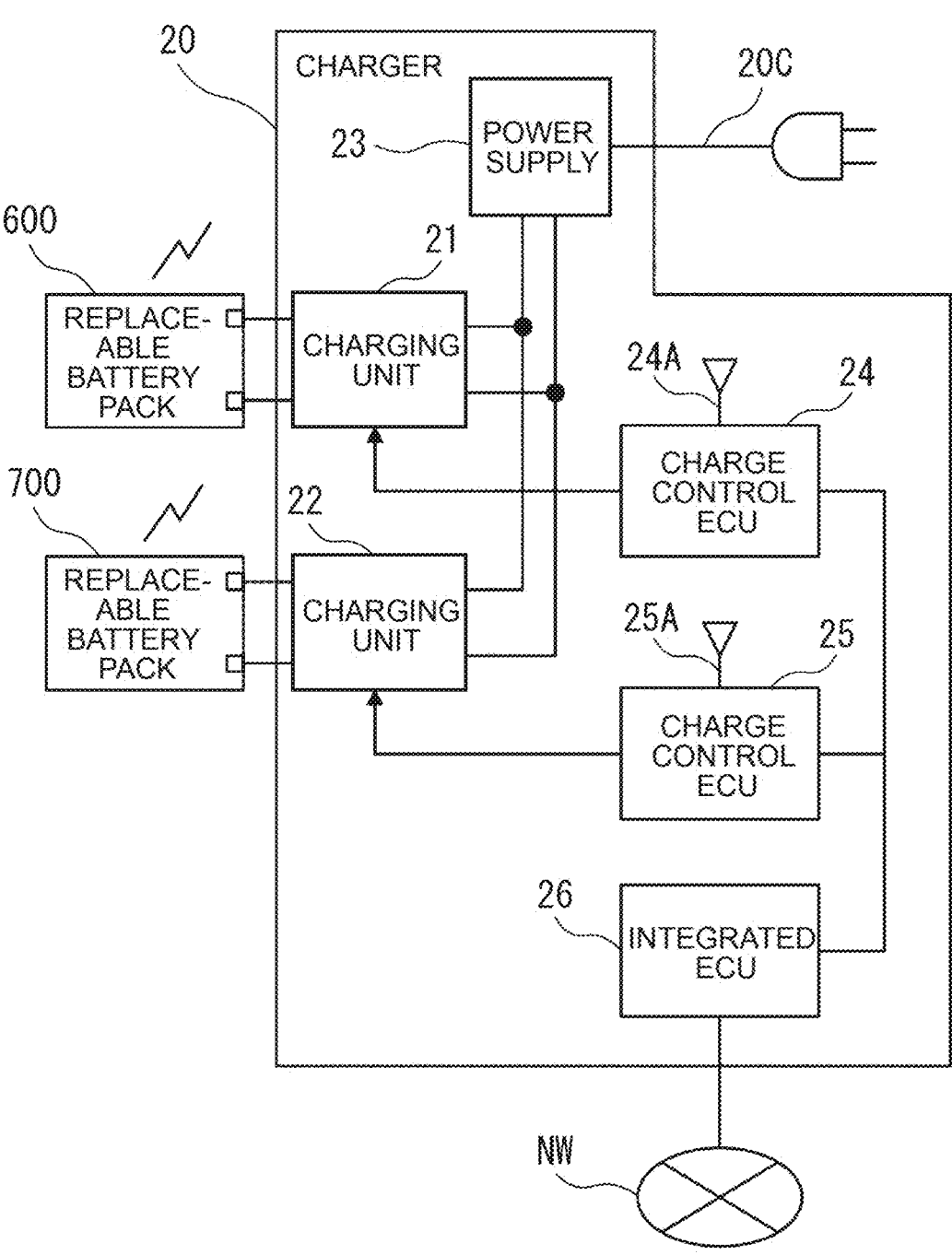
FIG. 4 is an example of a diagram illustrating details of a charger.

Next, the details of the charger 20 will be described with reference to FIG. 4.

The charger 20 includes a plurality of charging units 21 and 22 and a power supply unit 23. The charger 20 includes a plurality of charge managing ECU 24, 25 and an integrated ECU 26.

The charging units 21 and 22 are both connected to the power supply unit 23. The power supply unit 23 includes a power cord 20C for connecting to an AC power supply. The power supply unit 23 converts the power of the AC voltage supplied through the power cord 20C into the power of the DC voltage. Accordingly, the power supply unit 23 can supply DC voltage power to the charging units 21 and 22. Accordingly, when the replaceable battery pack 600 is connected to the charging unit 21, the charging unit 21 charges the replaceable battery pack 600. Similarly, when the replaceable battery pack 700 is connected to the charging unit 22, the charging unit 22 charges the replaceable battery pack 700.

The charge managing ECU 24 manages whether the replaceable battery pack 600 is connected to the charging unit 21, the state of charge of the replaceable battery pack 600, and the like. For example, when the replaceable battery pack 600 is not connected to the charging unit 21, the charge managing ECU 24 determines that the replaceable battery pack 600 is being lent. When the replaceable battery pack 600 is connected to the charging unit 21, the charge managing ECU 24 determines that the replaceable battery pack 600 is waiting for lending.

The charge managing ECU 24 includes an antenna 24A, and the antenna 24A detects radio waves transmitted from the replaceable battery pack 600. The radio waves transmitted by the replaceable battery pack 600 include state-of-charge information such as a charge rate, a charge amount, and a charge level of the replaceable battery pack 600. Accordingly, the charge managing ECU 24 can manage the charge status of the replaceable battery pack 600 and the like.

Similarly, the charge managing ECU 25 manages whether the replaceable battery pack 700 is connected to the charging unit 22, the state of charge of the replaceable battery pack 700, and the like. The charge managing ECU 25 includes an antenna 25A, and the antenna 25A detects radio waves transmitted from the replaceable battery pack 700. According to the charge state information included in the radio waves transmitted from the replaceable battery pack 700, the charge managing ECU 25 can manage the charge state of the replaceable battery pack 700 and the like.

The integrated ECU 26 is connected to a charge managing ECU 24, 25. The integrated ECU 26 sends a usage status of the replaceable battery pack 600,700 by the charge managing ECU 24, 25 (specifically, a lending management status such as a lending status or a lending standby status) to the communication networking NW. Communication networking NW include, for example, LAN (Local Area Network) and the internet. The communication networking NW is connected to servers (not shown) that manage usage of the replaceable battery pack 600,700. As will be described later, for example, the integrated ECU 26 accesses the server and performs a check regarding the unpairing of the replaceable battery pack 600 from the vehicle 10.

If the unpairing is confirmed, the integrated ECU 26 allows the use of the replaceable battery pack 600 in vehicles other than the vehicle 10. Conversely, if the unpairing cannot be confirmed, the integrated ECU 26 restricts the use of the replaceable battery pack 600 in vehicles other than the vehicle 10. This is because although the replaceable battery pack 600 is limited to use in the vehicle 10 by pairing, it may have been stolen from the vehicle 10 and returned to the charger 20 as a stolen item and connected thereto.

Figure 5:
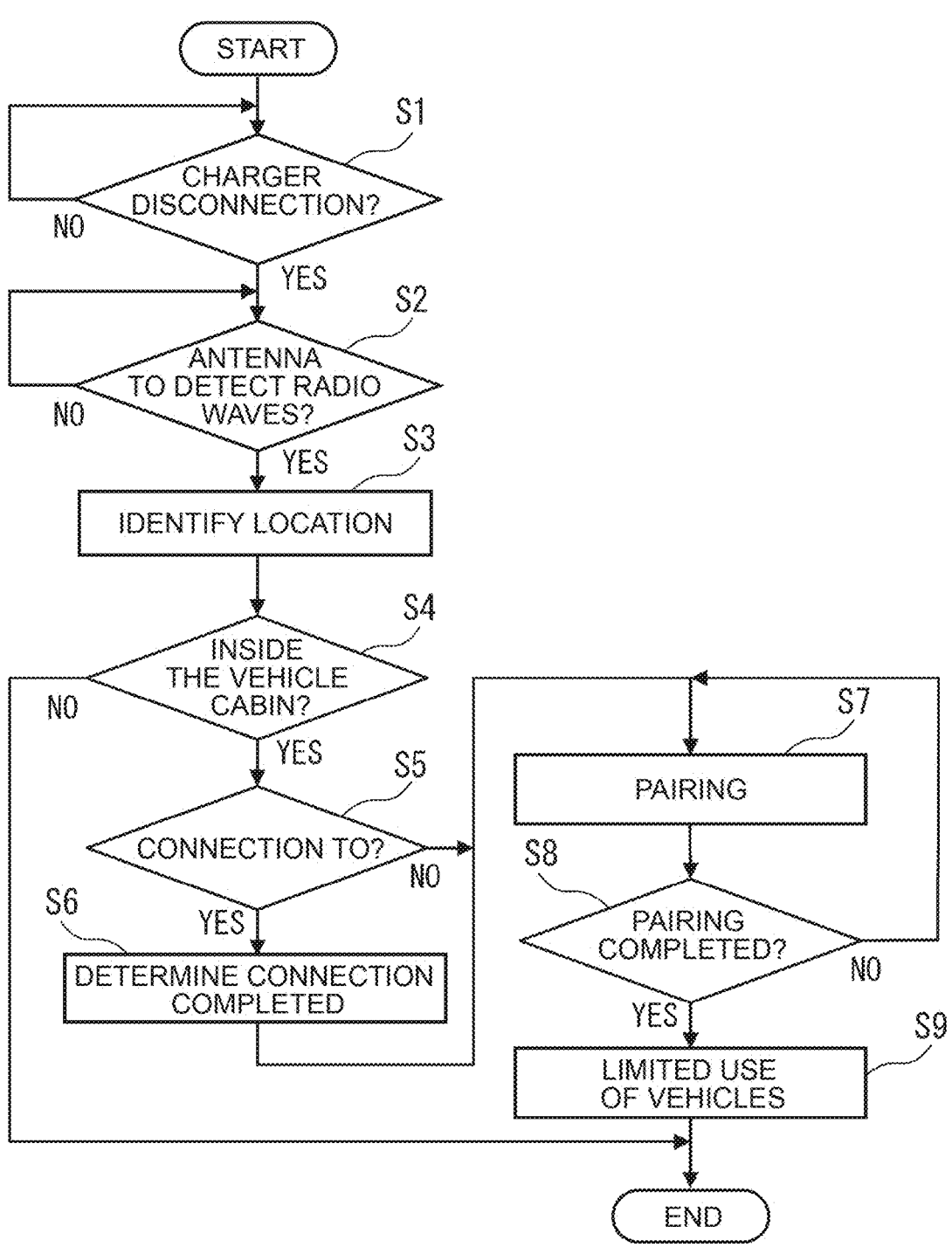
FIG. 5 is a flow chart illustrating an exemplary operation of the battery ECU and EVECU.

Next, referring to FIG. 5, an operation in which EVECU 17 cooperates with the battery ECU 106 will be described.

For example, when the replaceable battery pack 100 mounted on the vehicle 10 is connected to the charger 20, the replaceable battery pack 100 may be lent out from the charger 20. First, the battery ECU 106 determines whether or not the replaceable battery pack 100 is disconnected from the charger 20 (S1). If the replaceable battery pack 100 is connected to the charger 20, the battery ECU 106 determines that the replaceable battery pack 100 is not disconnected from the charger 20 (S1: NO). The battery ECU 106 then repeats S1 process. When the replaceable battery pack 100 is removed from the charger 20 by the driver of the vehicle 10, the battery ECU 106 determines that the replaceable battery pack 100 has been removed from the charger 20 (S1: YES).

When the replaceable battery pack 100 is disconnected from the charger 20, EVECU 17 determines whether the antenna ATN1, ATN2 has detected radio waves (S2). The order in which S1, S2 are processed may be reversed. In addition, S1, S2 process may be executed in parallel. For example, radio waves emitted from the replaceable battery pack 100 may not reach the antenna ATN1, ATN2 until the replaceable battery pack 100 is mounted on the vehicle 10. Then, EVECU 17 determines that the antenna ATN1, ATN2 is not detecting a radio wave (S2: NO).

When the replaceable battery pack 100 approaches the vehicle 10, radio waves transmitted from the replaceable battery pack 100 easily reach the antenna ATN1, ATN2. When the radio waves of the replaceable battery pack 100 reach the antenna ATN1, ATN2, the antenna ATN1, ATN2 can detect the radio waves. Accordingly, EVECU 17 determines that the antenna ATN1, ATN2 has detected a radio wave (S2: YES).

If the antenna ATN1, ATN2 detects radio waves, EVECU 17 determines the location of the replaceable battery pack 100 (S3). As described above, EVECU 17 identifies the disposition position of the replaceable battery pack 100, which is an exemplary particular replaceable battery pack, based on the radio wave strength of the radio wave detected by the antenna ATN1, ATN2.

For example, the replaceable battery pack 100 may be placed outside the vehicle cabin (e.g., on a road) of the vehicle 10 depending on the radio wave strength of the radio wave detected by the antenna ATN1, ATN2. Therefore, when the radio wave strength is low, EVECU 17 can specify that the disposition position of the replaceable battery pack 100 is outside the vehicle cabin.

On the other hand, depending on the radio wave strength of the radio wave detected by the antenna ATN1, ATN2, the replaceable battery pack 100 may be placed in the vehicle cabin of the vehicle 10 (e.g., the passenger compartment or the luggage compartment). Therefore, when the radio wave strength is high, EVECU 17 can specify that the disposition position of the replaceable battery pack 100 is inside the vehicle cabin. EVECU 17 can determine the intensity of the radio wave intensity by the threshold intensity.

Here, EVECU 17 determines whether or not the disposition position of the replaceable battery pack 100 is in the vehicle cabin (S4). When the arrangement position is outside the vehicle cabin (S4: NO), EVECU 17 skips the subsequent processing and ends the processing. As a result, when the replaceable battery pack 100 is placed outside the vehicle cabin such as on the road, pairing between the replaceable battery pack 100 and the vehicle 10 to be described later is avoided.

On the other hand, when the arrangement position is in the vehicle cabin (S4: YES), EVECU 17 determines whether or not there is a connection destination (S5). For example, when the disposition position of the replaceable battery pack 100 corresponds to the position of the battery terminal base 111, EVECU 17 determines that there is a connection destination (S5: YES). Even if the disposition position of the replaceable battery pack 100 corresponds to the position of the battery terminal base 112, EVECU 17 determines that there is a connection destination. On the other hand, if the disposition position of the replaceable battery pack 100 temporarily corresponds to the position of the cargo compartment, EVECU 17 determines that there is no connection destination (S5: NO).

If there is a connection destination, EVECU 17 determines that the connection between the replaceable battery pack 100 and the battery terminal base 111 is completed (S6). That is, EVECU 17 determines that the replaceable battery pack 100 is connected to the battery terminal base 111. If there is no destination, EVECU 17 skips S6 process. This allows EVECU 17 to identify whether the replaceable battery pack 100 is mounted for powering the vehicle 10 or as a spare.

When S6 process is executed or S6 process is skipped, EVECU 17 performs S7 between the replaceable battery pack 100 and the vehicles 10. More specifically, EVECU 17 first transmits a radio wave WL including identification information for identifying the vehicles 10 from any of the antennae ATN1, ATN2. The radio communication device 109 of the replaceable battery pack 100 receives the radio wave WL and extracts the identification data. The battery ECU 106 acquires the identification information from the radio communication device 109 and stores the identification information in the memory of the battery ECU 106. In this manner, EVECU 17 performs pairing between the replaceable battery pack 100 and the vehicles 10.

Note that the replaceable battery pack 200,300,400,500 disposed in the vehicle cabin of the vehicle 10 is paired in units of replaceable battery packs in EVECU 17 as in the case of the replaceable battery pack 100. EVECU 17 continues to process S7 until all pairing is completed (S8: NO). When the pairing is completed (S8: YES), EVECU 17 limits the vehicles to be used by the replaceable battery pack 100,200,300,400,500 (S9) and ends the process. That is, EVECU 17 limits the vehicle to be used by the replaceable battery pack 100,200,300,400,500 to the vehicle 10.

Accordingly, even if at least one of the replaceable battery packs 100,200,300,400,500 is stolen, the vehicle to be used is limited to the vehicle 10, and therefore, even if the vehicle is attempted to be used in another vehicle other than the vehicle 10, the use thereof is restricted. Although details will be described later, inconsistency between the identification information of the vehicle 10 stored in the replaceable battery pack 100 or the like and other vehicles restricts use in other vehicles.

In other words, use in other vehicles due to theft, such as replaceable battery pack 100, is wasted, resulting in theft protection. The identification information stored in the replaceable battery pack 100 is erased by connecting to the charger 20. This allows the replaceable battery pack 100 to be reused in other vehicles.

Figure 6:
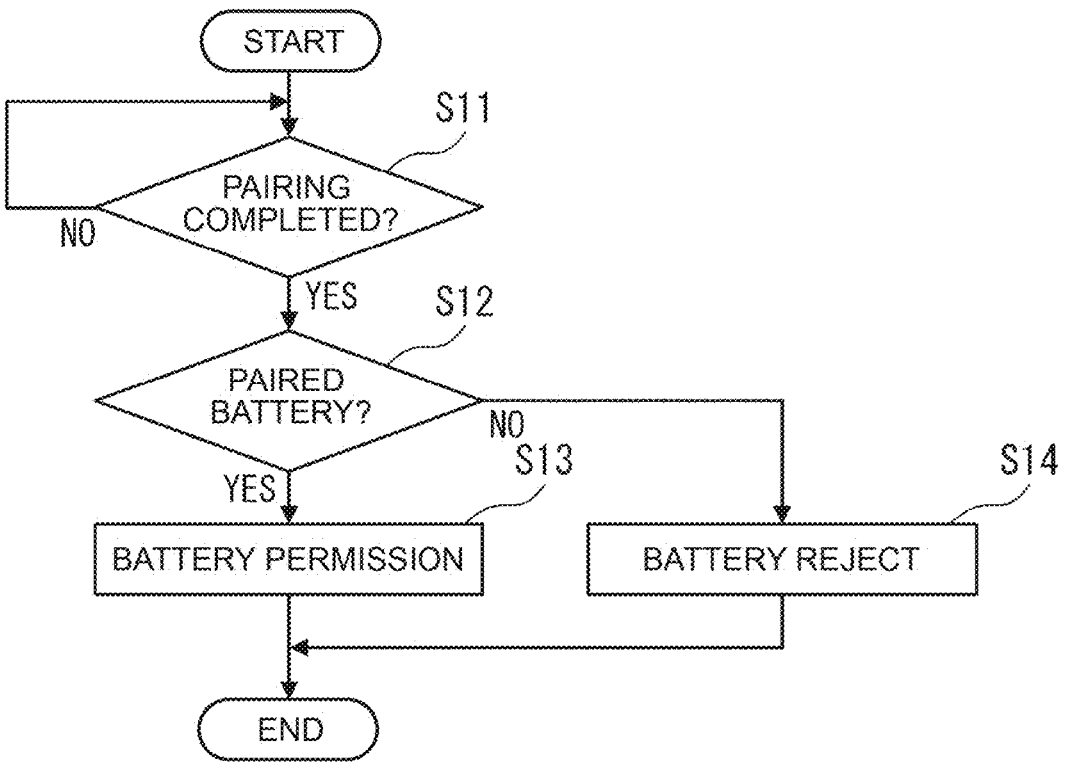
FIG. 6 is a flow chart illustrating an exemplary operation of EVECU.

Next, referring to FIG. 6, a single operation of EVECU 17 will be described.

First, when the replaceable battery pack 600 is mounted on the vehicle 10, it is determined whether EVECU 17 has been paired (S11). If the replaceable battery pack 600 already stores the identification information of the vehicle 10 or another vehicle other than the vehicle 10, EVECU 17 is determined to have been paired (S11: YES). For example, if the replaceable battery pack 600 has been lent from the charger 20 in the past and is connected to the vehicle 10 at least once, the identification information of the vehicle 10 is already stored in the replaceable battery pack 600. When the replaceable battery pack 600 is mounted on the vehicle 10 again, it is determined that EVECU 17 has been paired. Further, if the replaceable battery pack 600 is not lent out from the charger 20 and is stolen from another vehicle other than the vehicle 10, identification information of another vehicle is stored in the replaceable battery pack 600. Even in such cases, it is determined that EVECU 17 has been paired. On the other hand, if such identity is not stored in the replaceable battery pack 600, it is determined that EVECU 17 has not been paired (S11: NO). For example, when the replaceable battery pack 600 is returned to the charger 20 and is reconnected, and the replaceable battery pack 600 is again lent out from the charger 20, the identification information is deleted by normal operation. In such cases, it is determined that EVECU 17 has not been paired. If the pairing is not completed, EVECU 17 may execute either of the above-described processes in S1, S7 or may terminate the processes.

When S11 process is completed, EVECU 17 then determines whether or not the batteries have been paired with the vehicles to be used (S12). For example, when the vehicle to be used by the replaceable battery pack 600 is the vehicle 10 and the identification information of the vehicle 10 is stored in the replaceable battery pack 600, it is determined that EVECU 17 is a paired battery (S12: YES). In this situation, EVECU 17 permits the use of the replaceable battery pack 600 in the vehicle 10 (S13) and ends the process.

On the other hand, if the vehicle to be used by the replaceable battery pack 600 is the vehicle 10, but the identification information of the vehicle other than the vehicle 10 is stored in the replaceable battery pack 600, it is determined that EVECU 17 is not a paired battery (S12: NO). In this instance, EVECU 17 rejects the use of the replaceable battery pack 600 in the vehicle 10 (S14) and ends the process. This wastes the use of the replaceable battery pack 600 in other vehicles due to theft, resulting in theft protection.

Figure 7:
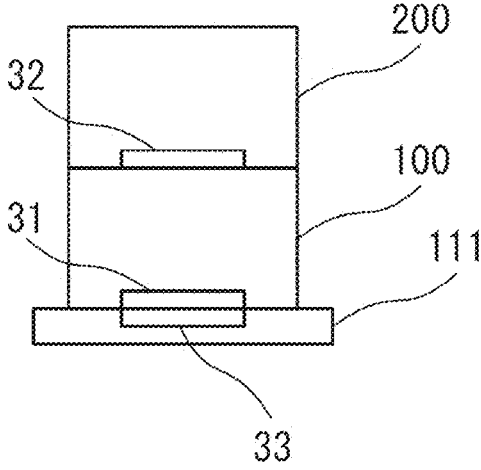
FIG. 7 is an example of a diagram for explaining identification of an arrangement position using a non-contact tag and a non-contact tag reader.

Next, with reference to FIG. 7, an example of improving the accuracy of specifying the position where the replaceable battery pack 100 and the like are arranged will be described.

For example, the replaceable battery pack 100 may be mounted on the vehicle 10 as a power supply target, and the replaceable battery pack 200 may be stacked on the replaceable battery pack 100 as a spare. As described above, when the replaceable battery pack 100, 200 overlaps, EVECU 17 may misunderstand that the replaceable battery pack 100, 200 is disposed at the same position, which may reduce the accuracy of specifying the position.

Therefore, for example, each of the replaceable battery packs 100,200 may include the non-contact tags 31 and 32, and the battery terminal base 111 may include the non-contact tag reader 33. Here, EVECU 17 identifies the position based on the radio wave strength of the radio wave WL transmitted by each of the replaceable battery packs 100,200 and the presence or absence of reading by the non-contact tag reader 33 of the predetermined data recorded in the non-contact tags 31 and 32.

For example, the non-contact tag reader 33 can read predetermined information of the non-contact tag 31 that is closer to the battery terminal base 111 than the replaceable battery pack 200. On the other hand, the non-contact tag reader 33 cannot read predetermined information of the non-contact tag 32 whose distance from the battery terminal base 111 is longer than that of the replaceable battery pack 100. This makes it possible to identify that the replaceable battery pack 100 is mounted on the vehicle 10 as a power supply target, and that the replaceable battery pack 200 is mounted on the vehicle 10 as a spare.

Therefore, if EVECU 17 and the battery terminal base 111 are electrically connected to each other, EVECU 17 can accurately identify the position where the replaceable battery pack 100, 200 is disposed on the basis of the radio strength and the presence or absence of reading of the predetermined data.

Note that the replaceable battery pack 100,200 may include the non-contact tag reader 33, and the battery terminal base 111 may include any one of the non-contact tags 31 and 32. EVECU 17 may be electrically connected to any one of the non-contact tags 31 and 32. Even in such cases, EVECU 17 can accurately identify the position where the replaceable battery pack 100, 200 is disposed.

As described above, in the vehicle 10 including electrified vehicle, a plurality of replaceable battery packs 100,200, 300,400,500 are disposed in the vehicle cabin. The vehicles 10 include a plurality of antennae ATN1, ATN2 and an EVECU 17. The antenna ATN1, ATN2 detects, for example, a radio wave WL transmitted by the radio communication device 109 provided in the replaceable battery pack 100 from the base position of the battery terminal base 111. When the antenna ATN1, ATN2 detects such a radio wave WL, EVECU 17 identifies the arrangement position of the replaceable battery pack 100 based on the strength relation of the radio wave strength of the radio wave WL detected by the antenna ATN1, ATN2. Specifically, for example, EVECU 17 identifies the position of the particular replaceable battery pack 100 connected to the vehicle 10 via the battery terminal base 111 as the position of the battery terminal base 111.

The antenna ATN1, ATN2 can also detect a radio wave WL transmitted by a radio communication device provided in the replaceable battery pack 200 from the base position of the battery terminal base 112. In this case, the disposition position of the replaceable battery pack 200 connected to the vehicle 10 via the battery terminal base 112 is specified as the position of the battery terminal base 112. In addition, the antenna ATN1, ATN2 can also detect radio wave WL transmitted from the radio communication device provided in each of the replaceable battery packs 400,500 from the luggage compartment of the vehicle 10. In this case, the disposition position of the replaceable battery pack 400,500 mounted on the vehicle 10 is specified as the position of the luggage compartment.

As described above, the replaceable battery pack 100 can specify the position of the replaceable battery pack 100 without providing the communication terminal for specifying the position in the vehicle cabin separately from the P terminal 101 and the N terminal 102. Since the insertion and removal of the communication cord to and from the communication terminal does not occur, the time and effort of the replacement work of the replaceable battery pack 100 is suppressed, and the workability of the replacement work is improved.

While preferred embodiments of the present disclosure have been described in detail above, the present disclosure is not limited to such specific embodiments, and various modifications and changes can be made within the scope of the gist of the present disclosure described in the claims.

What is claimed is:

1. An electrified vehicle in which a plurality of replaceable battery packs is arranged in a vehicle cabin, comprising:

a plurality of antennas arranged in the vehicle cabin; and a control device that specifies an arrangement position of a specific replaceable battery pack, from among the replaceable battery packs, connected to the electrified vehicle via a battery terminal base for connecting at least one of the replaceable battery packs to the electrified vehicle, based on a radio wave intensity of a radio wave emitted from a communication unit provided in each of the replaceable battery packs when the radio wave is detected by the antennas from a base position of the battery terminal base.

2. The electrified vehicle according to claim 1, wherein the control device determines that the specific replaceable battery pack is connected to the battery terminal base when the arrangement position is specified.

3. The electrified vehicle according to claim 1, wherein the control device specifies the arrangement position based on an intensity relationship of the radio wave intensity.

4. The electrified vehicle according to claim 1, wherein:

one of the replaceable battery packs and the battery terminal base includes a non-contact tag;

another of the replaceable battery packs and the battery terminal base includes a non-contact tag reader; and the control device specifies the arrangement position based on the radio wave intensity and information recorded in the non-contact tag and read by the non-contact tag reader.

\* \* \* \* \*